(No Model.)
J. WILLMANN.
SULKY PLOW.
No. 500,090. Patented June 20, 1893.
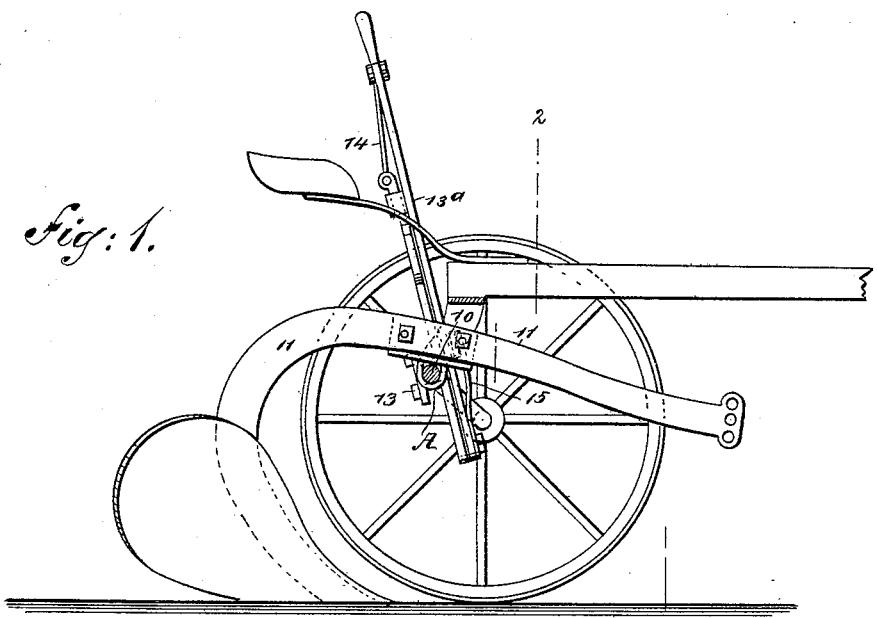
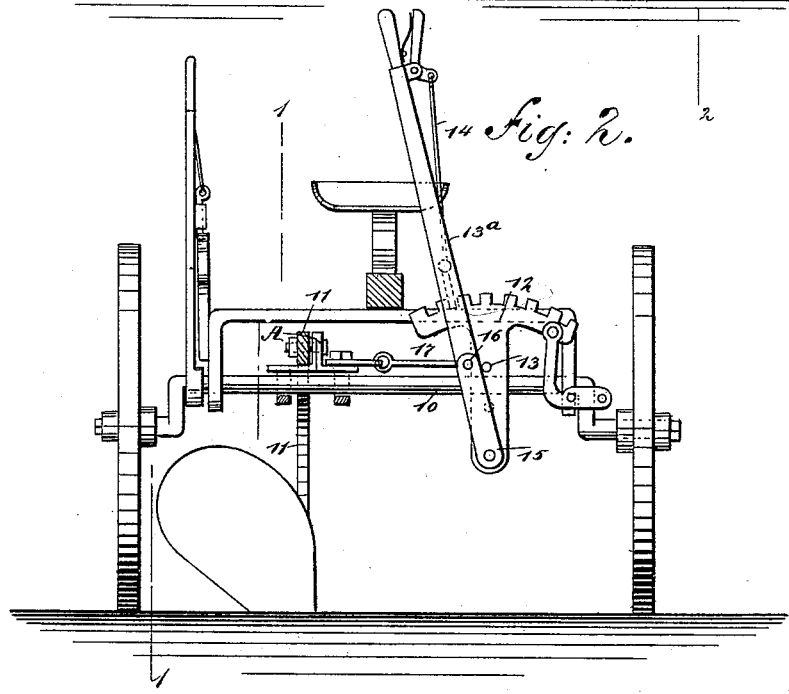
WITNESSES:
Chas Nida.
C. Sedgwick.
INVENTOR
J Willmann
BY Munn & Co
ATTORNEYS.

UNITED STATES PATENT OFFICE.

JOSEPH WILLMANN, OF NEW BRAUNFELS, TEXAS, ASSIGNOR OF ONE-HALF TO LOUIS HENNE, OF SAME PLACE.

SULKY-PLOW.

SPECIFICATION forming part of Letters Patent No. 500,090, dated June 20, 1893.

Application filed March 28, 1893. Serial No. 467,965. (No model.)

*To all whom it may concern:*

Be it known that I, JOSEPH WILLMANN, of New Braunfels, in the county of Comal and State of Texas, have invented a new and useful Improvement in Sulky-Plows, of which the following is a full, clear, and exact description.

My invention relates to an improvement in sulky plows, and it has for its object to provide a means whereby the plow may be shifted laterally by the driver during the act of plowing whenever such action is deemed advisable, thereby changing the cut whenever occasion may demand.

A further object of the invention is to provide mechanism of simple and durable construction whereby the above result may be attained, the mechanism being capable of attachment to any form of wheeled plow, especially a two-wheeled plow.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a vertical longitudinal section taken on the line 1—1 of Fig. 2; and Fig. 2 is a vertical transverse section through the plow, taken essentially on the line 2—2 of Fig. 1.

In carrying out the invention the plow block A, is mounted to slide upon the axle 10 of the sulky plow, and the plow beam 11, is connected by clamps or otherwise with the plow block; the beam extends in the usual manner both forwardly and rearwardly over the axle. A rack 12, is secured upon the axle by means of a clip 13 of any approved construction, and preferably the rack is made semi-circular and is provided with a shank which extends below the axle, the clip 13, being secured to said shank. Upon the rear of the shank, ordinarily at its lower end, the lower end of a lever 13ª, is pivoted, and this lever is provided with a thumb latch 14, adapted for engagement with the rack. Usually a strap 15, is pivoted upon the same pivot pin pivoting the lever, and the strap at its upper end is connected with the lever by a a bolt 16, and a link 17, is connected with the bolt 16 and with the plow block, preferably at one end of the latter. Thus as the lever is moved in direction of either wall of the plow carriage, the plow block will be moved along the axle and the position of the plow connected with the beam will be shifted, thereby changing the cut. The lever extends upward near the rear of the driver's seat and within convenient reach thereof.

It will be observed that this device is exceedingly simple, that it is economic and that it is capable of manipulation to change the cut as desired and of application to any form of wheeled plow, and furthermore that it is especially adapted for attachment to sulky plows, enabling the operator, as heretofore stated, to shift the plow and change the cut and to thereby compensate for any sliding movement that may take place on the part of the wheels; furthermore, the driver will be enabled to avoid any obstruction that may suddenly appear in the path of the plow. The link 17 and connections between the lever 13ª, and the slide block A, range substantially in the direction of the axle, and thus afford a direct resistance to the side thrust of the plow.

Having thus described my invention, I claim as new and desire to secure by Letters Patent—

1. In a sulky-plow the combination with a wheeled axle, a plow block clipped to the axle and fitted to slide thereon, and a plow beam secured to the block, of a lever pivoted for movement transversely of the sulky, and link connections between the lever and plow block said connections ranging transversely and offering a direct resistance to and in the line of the side thrust on the blocks, substantially as described.

2. In a sulky plow, the combination with a wheeled axle, a plow block clipped to the axle for sliding movement, and a plow beam secured to the said block, of a toothed sector clipped to the axle and having a depending extension, a lever pivoted at its lower end to the said extension, and extending to the driver's seat, a link connecting the lever and the plow block, such link ranging in a substantially straight direction transversely of the sulky for the direct resistance to side thrust, and a strap 15, secured to the lower end of the lever and to the link at its connection with the lever, substantially as described.

JOSEPH WILLMANN.

Witnesses:
LOUIS HENNE,
GEORGE HENNE.